Patented Apr. 21, 1953

2,636,033

UNITED STATES PATENT OFFICE 2,636,033

PROCESS FOR PREPARING N-N' DIALKANOL PIPERAZINE

John David Malkemus, Austin, Tex., assignor to Colgate-Palmolive-Peet Company, Jersey City, N. J., a corporation of Delaware No Drawing. Application June 1, 1950, Serial No. 165,593

9 Claims. (Cl. 260—268)

This invention relates to a process for preparing N-N' dialkanol piperazines, and more particularly piperazino 1,4 bis (β ethanol). The piperazyl alkanol compounds and particularly the ester and ether derivatives thereof are known to possess valuable surface-active properties, and comprise useful detersive, wetting and dispersing agents.

Organic compositions of the N-N' dialkanol piperazine type, and especially the ester and ether derivatives of diethanol piperazine, such as disclosed in U. S. Patent 2,421,707, have been found to have valuable detersive characteristic properties in either acid or alkaline aqueous solutions. These ester and ether derivatives of diethanol piperazine have been made from N, N' diethanol piperazine as a starting material, the latter compound having heretofore been suitably prepared from piperazine. Piperazine, however, is at present relatively high priced and consequently increases the cost of producing the finished detergent product.

It has now been discovered that N-N' diethanol piperazine can be prepared directly in good yields from diethanolamine which is relatively inexpensive as compared to piperazine.

In accordance with the present invention N-N' diethanol piperazine is prepared from diethanolamine by heating diethanolamine in the presence of an inorganic catalyst, such as hereinafter more particularly defined, under conditions which cause the diethanolamine to condense, splitting off water, to form diethanol piperazine.

The general reaction may be illustrated as follows:

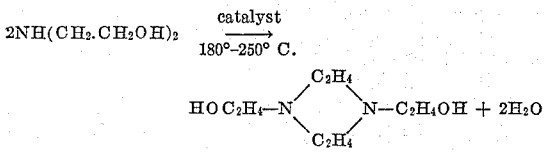

The inorganic catalytic substances found useful for promoting the condensation of diethanolamine to diethanol piperazine, as described, comprise inorganic acids or their acid salts. Examples of such inorganic acids and acid salts which induce the reaction are phosphoric acids and their acid salts, e. g. orthophosphoric acids, pyrophosphoric acid and sodium acid phosphate. Other inorganic acids and acid salts which may be used are sulfuric acid, hydrochloric acid, boric acid, sulfamic acid, sodium bisulfate, ammonium acid sulfate, etc.

Although many inorganic acids and their acid salts were found to induce the reaction, phosphoric acid and its acid salts were the most effective and are generally preferred because they produce a high yield of diethanol piperazine under optimum temperature and reaction time conditions. Attempts to employ alkalies, such as sodium hydroxide as a catalyst, did not produce the results desired using like proportionate amounts and reaction temperatures as in the case of acids and acid salts.

The reaction temperature and duration of treatment vary depending upon the relative proportionate amounts of diethanolamine and catalyst used, the particular catalyst employed and the amount of material to be converted. In general, a temperature between about 180 and 250° C. is used and the treatment is carried out over a period of from about one-half to five hours, and preferably from about two to three and one-half hours.

To prevent detrimental oxidative effects the reaction is conducted under reduced atmospheric pressure conditions, or in a non-oxidizing atmosphere such as carbon dioxide or nitrogen. When the reaction is carried out under oxidizing conditions the product is invariably darker than when non-oxidizing conditions are maintained. However, where the color of the product is not of particular importance, precautions to prevent free access of air during the reaction need not be taken.

During the reaction, water which is formed distills off and is collected in the form of distillate. Since one equivalent weight of water is formed for each mol of diethanolamine converted to diethanol piperazine, this provides a rough check on the progress of the reaction. When no more water distills from the reaction mixture the heating of the mixture is stopped and, after allowing the mass to cool to room temperature, it is filtered to recover the diethanol piperazine in the form of crystals. The mass of crystals thus recovered are washed with ether and purified by recrystallization from methanol.

The reaction mixture containing diethanol piperazine and unreacted diethanolamine may be reacted without further treatment with fatty acids, fatty amides, etc. to form a resultant reaction mixture containing an ester of diethanol piperazine. Similarly, the reaction mixture may be reacted with alkali metal followed by alkyl halides to form a resultant reaction product containing an ether of diethanol piperazine. Also mixed ester and ether reaction products may be formed if desired. Such reaction products and mixtures possess surface active properties and provide useful wetting, emulsifying, softening and foaming agents, etc.

The following examples are illustrative of the method of preparing diethanol piperazine and reaction products containing the same in accordance with this invention. The yield of diethanol piperazine was found by crystallization and recovery of the same from the reaction mixture or by estimating the amount of diethanol piperazine formed by the amount of water produced. Titration of the reaction mixture was used as a rough quantitative estimate of the diethanol piperazine formed, e. g. the inflection point at pH 5.0 was found by titration of prepared mixtures of diethanolamine (equivalent wt. 105) and diethanol piperazine (equivalent wt. 174), to give the calculated value for the proportion of amines present.

Example 1

A mixture of 31.50 grams (0.30 mol) of diethanolamine and 3.46 grams (0.03 mol) 85% phosphoric acid ($H_3PO_4$) was heated for 180 minutes at 200° C. under an atmosphere of $CO_2$ to protect the reaction product from contact with air. 3.60 grams of distillate was obtained containing 3.32 grams of water and indicating a 61.5% conversion since one equivalent weight of water is lost for each mol of diethanolamine converted to diethanolamine piperazine. Crystals formed in the reaction mass on standing at room temperature, and these were recovered by filtering and washing with ether. The recovered crystals were then recrystallized from methanol producing a white crystalline product melting at 134–136° C., being identical with diethanol piperazine as shown by a mixed melting point determination.

Example 2

In this example diethanolamine was condensed as in Example 1 using pyrophosphoric acid as the catalyst, and employing a reaction mixture comprising diethanolamine and pyrophosphoric acid of 20:1 respectively, and a reaction temperature of 200° C. for 180 minutes. Titration of the resultant reaction product indicated a large portion of the diethanolamine had been converted to diethanol piperazine.

Example 3

A mixture of diethanolamine and phosphoric acid ($H_3PO_4$) in a mol ratio of 100 diethanolamine to 1 of phosphoric acid was heated at 250° C. under an atmosphere of $CO_2$ for approximately 110 minutes. Using 31.50 grams (0.30 mol) of diethanolamine in the condensation reaction 4.32 grams of water was formed during the reaction indicating 80% conversion of diethanolamine to diethanol piperazine at this temperature. Diethanol piperazine formed crystallized from the reaction mass upon cooling.

Example 4

To 10.5 grams of diethanolamine (0.10 mol) were added 0.10 gram (0.001 mol) of sulfamic acid, and the mixture heated for three hours at 200° C. under reduced pressure (100 mm.). The reaction product was relatively light in color and titration tests indicated a good conversion to diethanol piperazine.

Example 5

This reaction was carried out using a 10 to 1 mol ratio of diethanolamine to sulfuric acid and heating at a temperature of 200° C. for 180 minutes under $CO_2$. Titration of the resultant reaction product indicated a substantial proportion of the diethanolamine present had been converted to diethanol piperazine.

Example 6

In this instance diethanolamine was heated to 250° C. for 180 minutes as in Example 5 in the presence of hydrochloric acid and using a mol ratio of 100:1 diethanolamine to hydrochloric acid. The reaction product was found by titration to comprise diethanol piperazine.

Example 7

Diethanolamine and boric acid in a mol ratio of 100:1, respectively, were heated for 200 minutes at a temperature of 250° C. under $CO_2$. The resultant reaction product was found to contain an appreciable amount of diethanol piperazine.

Example 8

In this example ammonium acid sulfate was used as the catalyst in a mol ratio of 10.1 diethanolamine to catalyst respectively. The reaction product formed upon heating the mixture for 180 minutes at 200° C. under an atmosphere of $CO_2$ was found to comprise a relatively high proportion of diethanol piperazine.

Example 9

As the catalyst in this instance sodium acid sulfate was used, employing a mol ratio of diethanolamine to catalyst of 10:1 respectively. After heating the mixture at 200° C. for 180 minutes in an atmosphere of $CO_2$, the reaction product was found to contain a considerable amount of diethanol piperazine.

Example 10

Example 9 was repeated using sodium acid phosphate as the catalyst in place of sodium bisulfate. In this case the reaction product upon titration showed that a relatively large amount of the diethanolamine had been converted to diethanol piperazine.

Diethanol piperazine prepared in accordance with the present process and reaction mixtures containing the same may be used for various purposes in the industry. The ester and ether derivatives of N-N' diethanol piperazine, as aforementioned, form an important class of surface active compounds, and such compounds and mixtures thereof possess useful wetting and detersive properties in both acid and alkaline solutions.

Although the invention has been described and illustrated by specific examples, it will be apparent to those skilled in the art that variations and modifications of the process can be made and equivalents utilized without departing from the principles and true spirit of the invention.

What is claimed is:

1. The process of producing N-N' diethanol piperazine which is light in color comprising heating a mixture of diethanolamine and a catalyst selected from the group consisting of inorganic acids and their acid salts under substantially nonoxidizing conditions and condensing two molecules of diethanolamine with the liberation of water forming thereby diethanol piperazine as a condensation product.

2. The process of producing N-N' diethanol piperazine from diethanolamine which consists in heating diethanolamine in the presence of a catalyst selected from the group consisting of inorganic acids and their acid salts to a temperature between about 180° and 250° C. and condensing two molecules of diethanolamine with the liberation of water forming thereby diethanol piperazine as a condensation product.

3. The process of producing N-N' diethanol piperazine from diethanolamine which comprises heating a mixture of diethanolamine and phosphoric acid to a temperature between about 180° and 250° C. and condensing two molecules of diethanolamine with the liberation of water forming thereby diethanolamine piperazine as a condensation product.

4. The process of producing N-N' diethanol piperazine from diethanolamine which comprises heating a mixture of diethanolamine and an acid salt of phosphoric acid to a temperature between about 180° and 250° C. and condensing two molecules of diethanolamine with the liberation of water forming thereby diethanol piperazine as a condensation product.

5. The process of producing N-N' diethanol piperazine from diethanolamine which comprises heating a mixture of diethanolamine and an inorganic acid catalyst to a temperature between about 180° and 250° C. and condensing two molecules of diethanolamine with the liberation of water forming thereby diethanol piperazine as a condensation product.

6. The process of producing N-N' diethanol piperazine from diethanolamine which consists in heating a mixture comprising diethanolamine and an inorganic acid catalyst to a temperature between about 180° and 250° C. under non-oxidizing atmospheric conditions and condensing two molecules of diethanolamine with the liberation of water forming thereby diethanol piperazine as a condensation product.

7. A process of preparing N-N' diethanol piperazine from diethanolamine which comprises the steps of heating diethanolamine in the presence of a catalyst selected from the group consisting of inorganic acids and their acid salts at a temperature between about 180° and 250° C. and under an atmosphere of carbon dioxide and condensing two molecules of diethanolamine with the liberation of water forming thereby diethanol piperazine as a condensation product.

8. A process of preparing N-N' diethanol piperazine which comprises heating a mixture of diethanolamine and an inorganic compound selected from the group consisting of inorganic acids and their acid salts and condensing two molecules of diethanolamine with the liberation of water forming thereby diethanol piperazine as a condensation product, and recovering the resultant diethanol piperazine from the reaction mixture.

9. A process of producing a reaction product containing N-N' diethanol piperazine comprising heating a mixture of diethanolamine and an inorganic compound selected from the group consisting of inorganic acids and their acid salts to a temperature and for a time sufficient to condense two molecules of diethanolamine with the liberation of water forming thereby diethanol piperazine as a condensation product.

JOHN DAVID MALKEMUS.

References Cited in the file of this patent

FOREIGN PATENTS

| Number | Country | Date |
|---|---|---|
| 657,979 | Germany | Mar. 3, 1936 |